(12) United States Patent
Li et al.

(10) Patent No.: US 10,046,958 B2
(45) Date of Patent: Aug. 14, 2018

(54) HOT AND COLD BEVERAGE DISPENSER

(71) Applicant: PepsiCo, Inc., Purchase, NY (US)

(72) Inventors: Xuejun Li, White Plains, NY (US); William W. Segiet, Bethel, CT (US); Fernando A. Ubidia, Ludlow, MA (US); John F. Lewis, Monson, MA (US); Aaron M. Stein, Middletown, CT (US)

(73) Assignee: PepsiCo, Inc., Purchase, NY (US)

( * ) Notice: Subject to any disclaimer, the term of this patent is extended or adjusted under 35 U.S.C. 154(b) by 22 days.

(21) Appl. No.: 15/155,633

(22) Filed: May 16, 2016

(65) Prior Publication Data
US 2016/0257550 A1    Sep. 8, 2016

Related U.S. Application Data

(62) Division of application No. 12/959,123, filed on Dec. 2, 2010, now Pat. No. 9,370,273.

(51) Int. Cl.
*B67D 1/00* (2006.01)
*A47J 31/41* (2006.01)
(Continued)

(52) U.S. Cl.
CPC ............ *B67D 1/0034* (2013.01); *A47J 31/41* (2013.01); *A47J 31/4403* (2013.01); *A47J 31/46* (2013.01);
(Continued)

(58) Field of Classification Search
CPC .. A47J 31/40; A47J 31/41; A47J 31/56; A47J 31/402; A47J 31/4403; B67D 2210/00118;
(Continued)

(56) References Cited

U.S. PATENT DOCUMENTS

| 4,068,781 A | 1/1978 | Toth |
| 4,211,342 A | 7/1980 | Jamgochian et al. |

(Continued)

FOREIGN PATENT DOCUMENTS

| CN | 2305134 Y | 1/1999 |
| CN | 101091622 A | 12/2007 |

(Continued)

OTHER PUBLICATIONS

UF-1 and UFB-1 Valves Training manual, copyright 1999-2005, IMI Cornelius, Inc., pp. 5-6.
(Continued)

*Primary Examiner* — J. Casimer Jacyna
(74) *Attorney, Agent, or Firm* — Sterne, Kessler, Goldstein & Fox P.L.L.C.

(57) ABSTRACT

An apparatus and method may be configured for detecting selection between a hot version and a cold version of a beverage, causing opening of a first of a plurality of valves and closing of a second of the plurality of valves for providing water to a first of a plurality of mixing chambers based on the selection, causing delivery of beverage concentrate to the first mixing chamber, controlling a flow rate of the water and a flow rate of the beverage concentrate into the mixing chamber for mixing of the water with the beverage concentrate in a controlled ratio to create the beverage, and dispensing the beverage from the mixing chamber.

15 Claims, 6 Drawing Sheets

(51) Int. Cl.
*A47J 31/56* (2006.01)
*A47J 31/44* (2006.01)
*A47J 31/46* (2006.01)
*B67D 1/08* (2006.01)
*B67D 1/12* (2006.01)

(52) U.S. Cl.
CPC ............ *A47J 31/56* (2013.01); *B67D 1/0857* (2013.01); *B67D 1/0888* (2013.01); *B67D 1/0895* (2013.01); *B67D 1/1218* (2013.01); *A47J 2202/00* (2013.01); *B67D 2210/00102* (2013.01); *B67D 2210/00118* (2013.01); *B67D 2210/00123* (2013.01)

(58) Field of Classification Search
CPC ........ B67D 2210/00123; B67D 1/0034; B67D 1/0888; B67D 1/1218
See application file for complete search history.

(56) References Cited

U.S. PATENT DOCUMENTS

| | | | |
|---|---|---|---|
| 4,649,809 A | | 3/1987 | Kanezashi |
| 4,792,059 A | * | 12/1988 | Kerner ................ B67D 3/00 222/129.1 |
| 4,903,862 A | | 2/1990 | Shannon et al. |
| 5,064,097 A | | 11/1991 | Brog et al. |
| 5,129,549 A | | 7/1992 | Austin |
| 5,245,914 A | | 9/1993 | Vitous |
| 5,285,718 A | | 2/1994 | Webster et al. |
| 5,299,715 A | | 4/1994 | Feldman |
| 5,312,020 A | | 5/1994 | Frei |
| 5,724,883 A | | 3/1998 | Usherovich |
| 5,845,815 A | | 12/1998 | Vogel |
| 5,875,930 A | | 3/1999 | Nakajima et al. |
| 5,975,365 A | | 11/1999 | Hsieh |
| 6,003,733 A | | 12/1999 | Wheeler |
| 6,016,935 A | | 1/2000 | Huegerich et al. |
| 6,142,063 A | | 11/2000 | Beaulieu et al. |
| 6,182,555 B1 | | 2/2001 | Scheer et al. |
| 6,192,785 B1 | | 2/2001 | Trida et al. |
| 6,220,047 B1 | | 4/2001 | Vogel et al. |
| 6,240,829 B1 | | 6/2001 | Mcgarrah |
| 6,460,735 B1 | | 10/2002 | Greenwald et al. |
| 6,522,834 B1 | | 2/2003 | Herrick et al. |
| 6,532,749 B2 | | 3/2003 | Rudick et al. |
| 6,669,053 B1 | | 12/2003 | Garson et al. |
| 6,685,059 B2 | | 2/2004 | Jones et al. |
| 6,772,919 B2 | | 8/2004 | Magri |
| 6,915,732 B2 | | 7/2005 | Jones et al. |
| 6,915,926 B2 | | 7/2005 | Naik |
| 6,938,801 B1 | | 9/2005 | Reddy et al. |
| 7,051,646 B2 | | 5/2006 | Della Pietra et al. |
| 7,147,131 B2 | | 12/2006 | Sher et al. |
| 7,231,142 B1 | | 6/2007 | Leung et al. |
| 7,337,624 B2 | | 3/2008 | Franck et al. |
| 7,347,345 B2 | | 3/2008 | Guerrero et al. |
| 7,592,084 B2 | | 9/2009 | Hoffjann et al. |
| 7,654,191 B2 | | 2/2010 | Greenwald et al. |
| 7,661,352 B2 | | 2/2010 | Sher et al. |
| 7,976,883 B2 | | 7/2011 | Guerrero et al. |
| 8,387,828 B2 | | 3/2013 | Moothart |
| 9,370,273 B2 | | 6/2016 | Li et al. |
| 2003/0101735 A1 | | 6/2003 | Teague et al. |
| 2004/0026452 A1 | | 2/2004 | Santiago et al. |
| 2004/0206244 A1 | | 10/2004 | Spiegel et al. |
| 2005/0236431 A1 | | 10/2005 | Rahn |
| 2005/0238768 A1 | | 10/2005 | Sher et al. |
| 2006/0006195 A1 | | 1/2006 | Jones et al. |
| 2006/0115572 A1 | * | 6/2006 | Guerrero ............ A47J 31/402 426/597 |
| 2006/0158240 A1 | | 7/2006 | Godhalekar et al. |
| 2007/0051248 A1 | | 3/2007 | Lee et al. |
| 2007/0080169 A1 | | 4/2007 | Sher et al. |
| 2008/0020115 A1 | | 1/2008 | Guerrero et al. |
| 2008/0282897 A1 | | 11/2008 | Webster et al. |
| 2009/0057340 A1 | | 3/2009 | Moothart |
| 2009/0095163 A1 | | 4/2009 | Sala et al. |
| 2009/0118668 A1 | | 5/2009 | Bixby |
| 2009/0166377 A1 | | 7/2009 | Piatnik et al. |
| 2010/0116842 A1 | | 5/2010 | Hecht et al. |
| 2011/0259472 A1 | | 10/2011 | Clark et al. |
| 2012/0006204 A1 | * | 1/2012 | Eidenschink ......... A47J 31/407 99/279 |

FOREIGN PATENT DOCUMENTS

| | | |
|---|---|---|
| JP | H81996-34493 | 2/1996 |
| JP | H81996-156997 | 6/1996 |
| JP | 3056263 | 11/1998 |
| RU | 2380020 C2 | 1/2010 |
| WO | WO 00/47058 A1 | 8/2000 |
| WO | WO 2006/058713 A1 | 6/2006 |
| WO | WO 2008/007278 A1 | 1/2008 |
| WO | WO 2010/037806 A1 | 4/2010 |

OTHER PUBLICATIONS

PCT/US2011/060749 International Search Report dated Jan. 16, 2012.

* cited by examiner

HOT AND COLD BEVERAGE DISPENSER

BACKGROUND INFORMATION

While cold beverage products are very popular, consumers are drinking an increasing number of hot beverages, especially non-carbonated beverages. Existing post-mix beverage dispensing equipment, however, cannot make both hot and cold drinks. Conventionally, a post-mix dispenser receives a concentrated beverage ingredient (e.g., syrup) in a container (e.g., bag-in-box) and mixes the concentrate with cold water to produce a cold beverage upon demand.

BRIEF SUMMARY

The following presents a simplified summary in order to provide a basic understanding of some aspects of the disclosure. The summary is not an extensive overview. It is neither intended to identify key or critical elements nor to delineate the scope of the disclosure. The following summary merely presents some concepts in a simplified form as a prelude to the more detailed description below.

An apparatus and method may be configured for detecting selection between a hot version and a cold version of a beverage, causing opening of a first of a plurality of valves and closing of a second of the plurality of valves for providing water to a first of a plurality of mixing chambers based on the selection, causing delivery of beverage concentrate to the first mixing chamber, controlling a flow rate of the water and a flow rate of the beverage concentrate into the mixing chamber for mixing of the water with the beverage concentrate in a controlled ratio to create the beverage, and dispensing the beverage from the mixing chamber.

BRIEF DESCRIPTION OF THE DRAWINGS

A more complete understanding of the present disclosure and the advantages thereof may be acquired by referring to the following description in consideration of the accompanying drawings, in which like reference numbers indicate like features, and wherein.

DETAILED DESCRIPTION OF EXAMPLE EMBODIMENTS

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope and spirit of the present invention.

Figure 1:
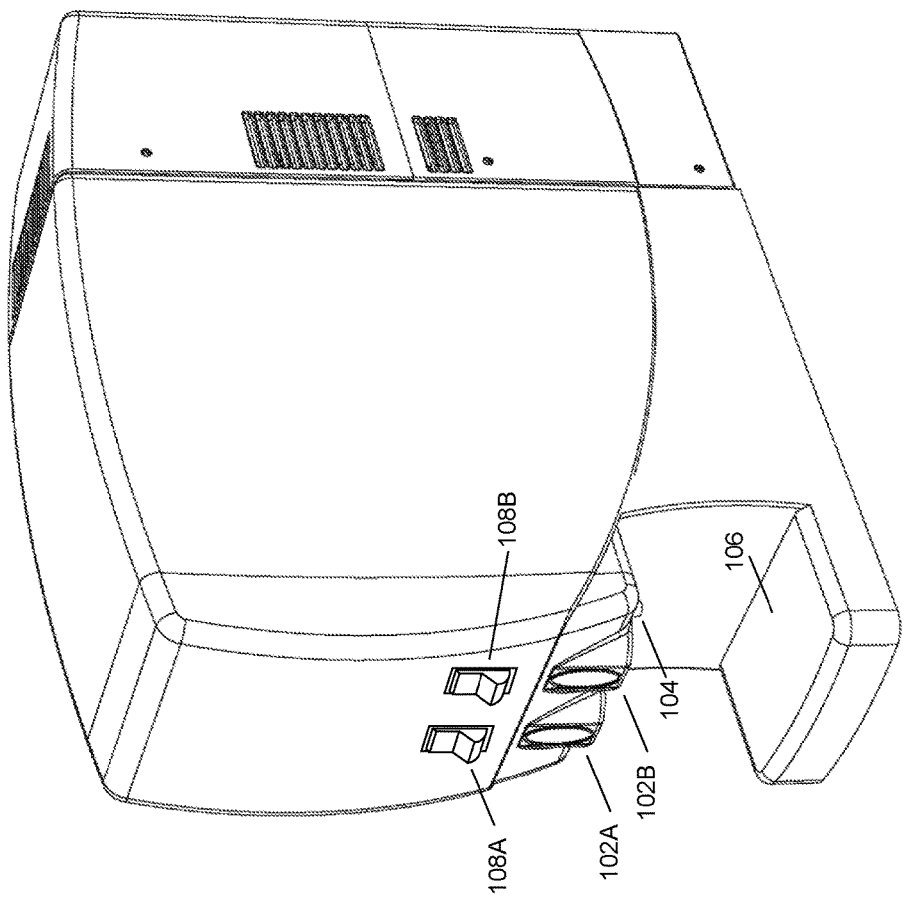
FIG. 1 illustrates an example embodiment of a beverage dispenser that can produce hot and cold versions of a same beverage using post-mix dispensing technology.

FIG. 1 illustrates an example embodiment of a beverage dispenser 100 that can produce hot and cold versions of a same beverage using post-mix dispensing technology. The beverage dispenser 100 may include a dispense switch 102, an output nozzle 104, and a temperature selector switch 108. When a beverage is desired, a user may place a cup on base surface 106 underneath a nozzle 104 corresponding to the dispense switch 102 to be actuated. The user may then select a desired temperature (e.g., hot, cold, etc.) for the beverage using the temperature selector switch 108, and may actuate the dispense switch 102 to cause the beverage dispenser 100 to create and output the beverage into the cup. The temperature selector switch 108 may be a rocker switch as shown, or may be a dial or other type of indicator permitting a user to select a desired beverage temperature. Each dispense switch 102 may have a corresponding nozzle 104 for dispensing a beverage. The beverage dispenser 100 may dispense a different flavored beverage at each nozzle 104 or multiple nozzles 104 may output the same flavored beverage. The beverage dispenser 100 may be of other shapes and sizes than the one shown in FIG. 1, and may include more or fewer dispense switches 102. Advantageously, the beverage dispenser 100 may have a lower equipment cost, require less space, and increase product variety by offering hot and cold versions of each beverage.

Figure 2:
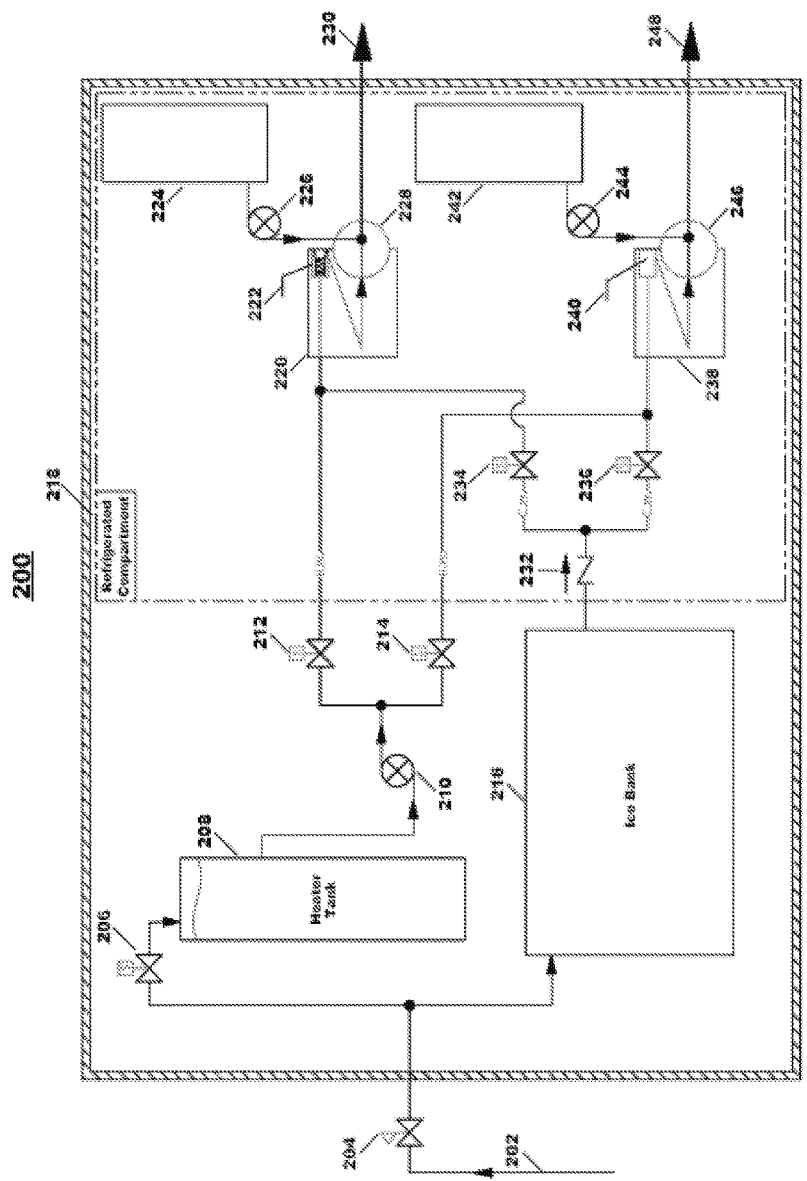
FIG. 2 illustrates an example plumbing system for a beverage dispenser.
Figure 3:
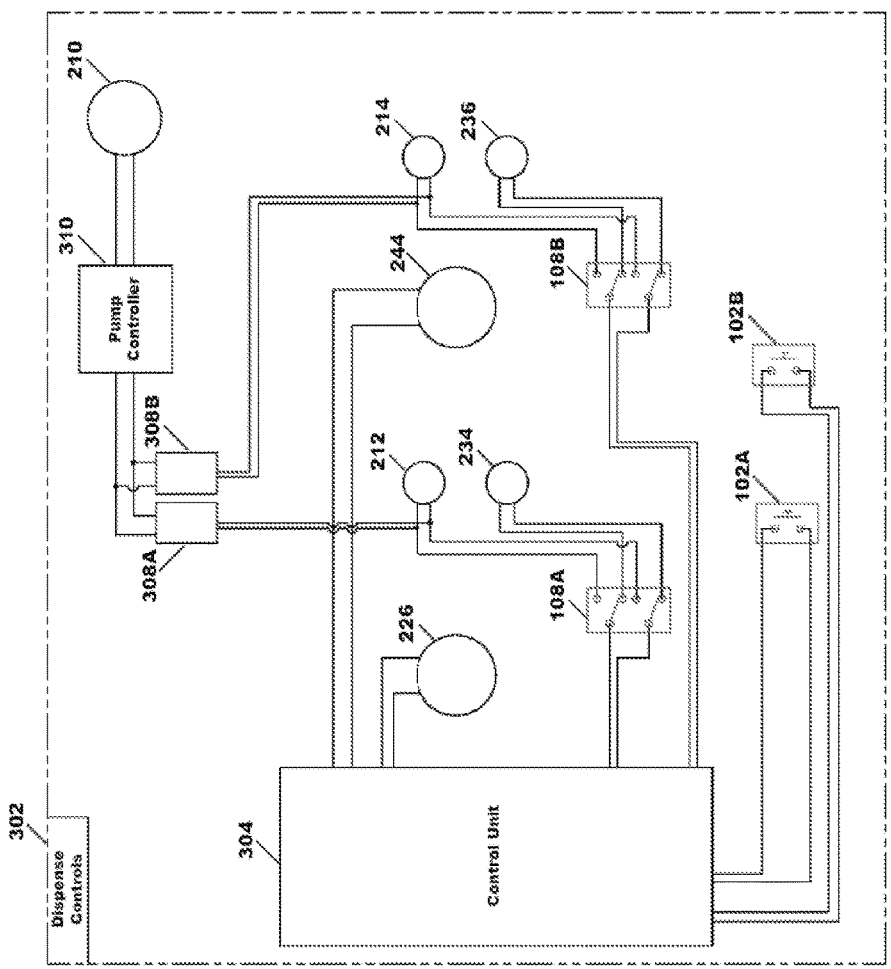
FIGS. 3-5 illustrate example control systems configured to control components depicted in the plumbing system.
Figure 4:
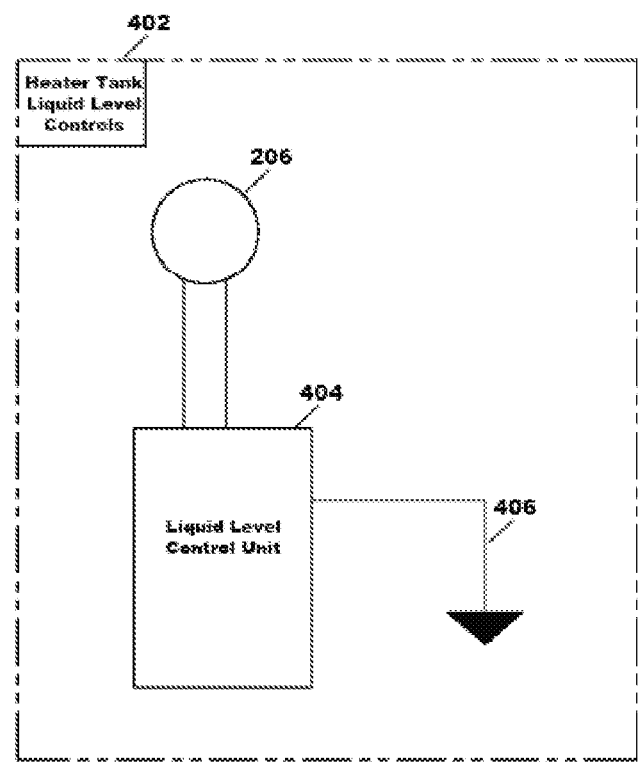
Figure 5:
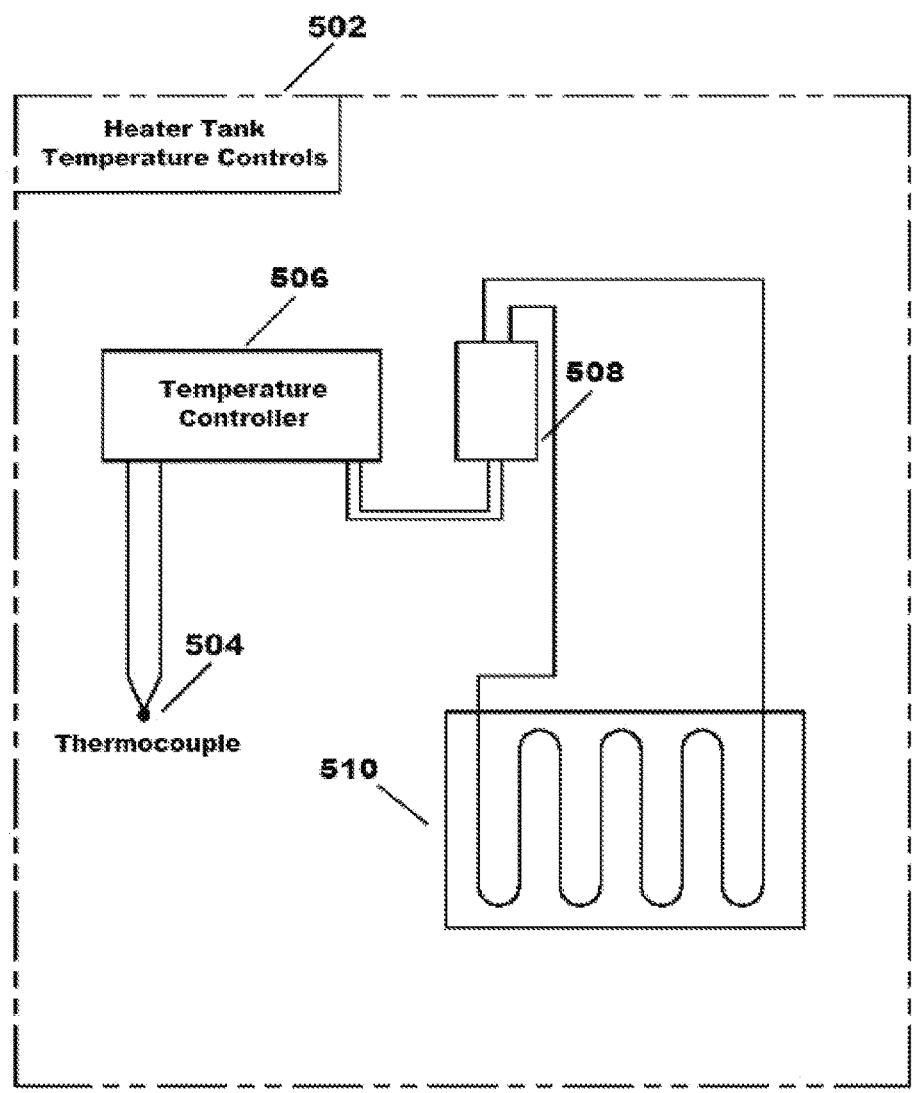

FIG. 2 illustrates an example plumbing system 200 for the beverage dispenser 100, and FIGS. 3-5 illustrate example control systems configured to control components depicted in the plumbing system. The depicted plumbing system 200 may create and dispense beverages at outlets 230, 248 that lead to a respective nozzle. The dispensed beverages may have the same or different flavors. The plumbing system 200 may also produce hot and cold versions of each beverage. The plumbing system 200, however, is an example, and can be extended to include more than two outlets and up to as many different beverage flavors as outlets.

Starting on the left, the plumbing system 200 may include a water inlet 202 to receive water (e.g., tap water, filtered water, etc.) from a water source. The water inlet 202 may be coupled to a water pressure regulator 204 that controls water pressure supplied to a fill solenoid valve 206 and to ice bank 216. The fill solenoid valve 206 may be associated with a level detector that determines a level of hot water contained in a heater tank 208. Hot water also may be supplied by an inline heater, hot incoming water, or other manners for providing hot water. Based on the detected level of hot water, the level detector may cause the fill solenoid valve 206 to open to permit water to enter the tank 208 when below a minimum level and to close to stop water from entering the tank 208 when the water has reached a maximum level. A gear pump 210 coupled to the heater tank 208 may control dispensing of the hot water. Also, other water driving mechanisms, such as gravity driven systems or air pumps may also control dispensing of the hot water. The water pressure regulator 204 may control the pressure of water supplied to the ice bank 216 for chilling until being dispensed. A one-way check valve 232 permits cold water to flow out of the ice bank 216 but prevents water from flowing back into the ice bank 216.

A series of solenoid valves 212, 214, 234, and 236 may control flow of water from either the heater tank 208 or the ice bank 216 to respective mixing apparatuses 220, 238. User selection of a beverage having a particular flavor and a hot or cold version of the beverage controls which of the solenoid valves 212, 214, 234, and 236 are open and which are closed. If a single beverage is being dispensed at a particular instant, one of the solenoid valves 212, 214, 234, and 236 may be open while the rest may be closed. If simultaneously dispensing multiple beverages from two or more nozzles 104, the beverage dispenser 100 may control the solenoid valves 212, 214, 234, and 236 to supply one of hot or cold water to the mixing chambers corresponding to the two or more nozzles 104. In response to selection of a hot version, hot water solenoid valves 212 and 214 direct hot water to a particular mixing apparatus 220 or 238 based on which beverage a user has selected for dispensing. In response to selection of a cold version, cold water solenoid valves 234 and 236 are used to direct cold water to a particular mixing apparatus 220 or 238 based on which beverage a user has selected for dispensing.

Each of the mixing apparatuses 220, 238 may mix either the hot or cold water with a beverage concentrate to create a beverage. Each mixing apparatus 220, 238 may include a flow control 222, 240 to control the amount of water provided to the mixing chambers 228, 246 and the concentrate pumps 226, 244 may control the amount of beverage concentrate provided to the mixing chamber 228 to control the water to concentrate ratio (e.g., 2 parts water, 1 concentrate (2:1), 3:1, etc.) of the beverage. The concentrate pumps 226, 244 may be, for example, peristaltic pumps. Also, other concentrate driving mechanisms, such as gravity driven systems or water driven systems may also control dispensing of the beverage concentrate.

The flow controls 222, 240 may be electronic or mechanical controllers that detect a flow rate of water and a flow rate of beverage concentrate supplied to the mixing apparatus 220, 238. Based on detected flow rates, the flow controls 222, 240 may adjust a size of orifices that supply water and beverage concentrate to the mixing chambers 228, 246. The orifices may be located at different locations along a water flow path between the solenoid valves 212, 214, 234, and 236 and the mixing chambers 228, 246, as well as at different locations between the pumps 226, 244 and the mixing chambers 228, 246.

In an example, the flow control 222 may electrically or mechanically control the size of an orifice in the water flow path or the concentrate flow path. The flow control 222 may determine that the concentrate flow rate exceeds a threshold and cause a decrease in the size of an orifice to reduce the amount of beverage concentrate flowing into the mixing chamber 228. The flow control 222 may also make similar adjustments of the water flow rate based on comparison with a threshold. The flow control 222 may also control a water orifice size based on beverage concentrate flow rate and a beverage concentrate orifice size based on water flow rate.

To adjust the size of the orifice, the flow control 222 may electrically or mechanically adjust the location of a piston relative to a sleeve. Moving a piston into a sleeve may obstruct and thereby reduce the size of the orifice to reduce a flow rate, and moving the piston out of the sleeve may further open and thereby increase the size of the orifice to increase a flow rate. For example, the flow control 240 may determine that a water pressure can only supply water at a certain flow rate, and may send an electrical signal to cause a piston in the concentrate flow path to near a sleeve to reduce the size of a beverage concentrate orifice to reduce the amount of beverage concentrate supplied to the mixing chamber 246.

In an example using mechanical control, the flow control 222 may include two ceramic flow controllers, a first being positioned in the water path and a second in the beverage concentrate path. Each ceramic flow controller may have a sleeve and a piston. Fluid pressure adjusts a location of the piston relative to the sleeve thereby controlling a size of an outlet orifice by adjusting the amount of fluid that can pass through the ceramic flow controller. Greater fluid pressure at one end of the piston causes the other end to enter the sleeve to reduce the size of the orifice, whereas lower pressure may cause the piston to back out of the sleeve thereby increasing the size of the orifice. The flow controls 222, 240 are optional and may also be omitted. Other types of flow control may also be used, such as a UF-1 or UFB-1 Valve by IMI Cornelius, Inc., described in the "UF-1 and UFB-1 Valves Training Manual," the contents of which are incorporated herein by reference in their entirety.

One or more concentrate containers 224, 242 with beverage concentrate may be housed within a refrigerated compartment 218 for storage at a desired temperature to lengthen shelf-life. The concentrate containers 224, 242 may also be stored outside of the beverage dispenser 100 at ambient temperatures. A concentrate container may be a bag-in-box container or other suitable container for storing a beverage concentrate until mixed with water. Each concentrate container 224, 242 may store the same beverage concentrate or may store two or more different flavors of beverage concentrate. In FIG. 2, only concentrate containers 224, 242 are depicted, but there may be as many concentrate containers as there are mixing apparatuses. Also, a single concentrate container may provide beverage concentrate to multiple mixing apparatuses, and, in such a scenario, multiple outlets may dispense a hot or cold version of the same flavored beverage. Each concentrate container 224, 242 may be associated with a concentrate pump 226, 244 to provide the beverage concentrate to either mixing chamber 228 or 246.

When a user desires a hot beverage, the gear pump 210 may pump hot water from the heater tank 208 to hot water solenoid valves 212 and 214 that control which one of the mixing chambers 228, 246 receives the hot water. The number of hot water solenoid valves and the number of cold water valves may correspond to the number of mixing apparatuses. If multiple hot beverages are being simultaneously dispensed at different nozzles, two or more hot water solenoid valves may open at the same time to direct hot water to each mixing apparatus for outputting a beverage at a respective nozzle. If hot and cold beverages are being simultaneously dispensed at different nozzles, multiple solenoid valves may open at the same time, providing one of hot and cold water to each of the mixing apparatuses for outputting a beverage at the respective nozzle.

If hot water solenoid valve 212 is open, then hot water may flow to the mixing apparatus 220. The other hot and cold water solenoid valves may be closed if no other beverages are being simultaneously dispensed. For example, cold water solenoid valves 234, 236 may remain closed to prevent cold water from entering the mixing chambers 228, 246 in response to selection of hot version. The mixing apparatus 220 may also receive the beverage concentrate, supplied by a concentrate pump 226, for mixing with the hot water in the mixing chamber 228 to create a hot beverage. The flow controller 222 may control the ratio of hot water to beverage concentrate supplied to the mixing chamber 228. The mixing chamber 228 may receive the ratio of water to concentrate for mixing to create a beverage and then output the hot beverage through outlet 230 to nozzle 104 for dispensing in a cup.

If hot water solenoid valve 214 is open, then hot water may flow to mixing apparatus 238. The other hot and cold water solenoid valves may be closed if no other beverages are being simultaneously dispensed. The mixing apparatus 238 may also receive beverage concentrate, supplied by a concentrate pump 244, for mixing with the hot water in a mixing chamber 246 to create a hot beverage. A flow control 240 and the concentrate pump 244 may control the water to concentrate ratio (e.g., 2 parts water, 1 concentrate (2:1), 3:1, etc.) of the beverage. The mixing chamber 246 may then output the hot beverage through outlet 248 to nozzle 104 for dispensing in a cup.

When a user desires a cold beverage at a particular nozzle, the beverage dispenser 100 may open one of the cold water solenoid valves 234, 236 corresponding to the nozzle for supplying cold water from the ice bank 216. Also, the gear pump 210 as well as the hot water solenoid valves 212, 214 may remain closed to prevent hot water from entering the mixing chambers 228, 246 if only a single cold beverage is being dispensed.

If cold water solenoid valve 234 is open, then cold water may flow to mixing apparatus 220. The other hot and cold water solenoid valves may be closed if no other beverages are being simultaneously dispensed. The mixing apparatus 220 may also receive beverage concentrate, supplied by a concentrate pump 226, for mixing with the cold water in a mixing chamber 228 to create a cold beverage. The flow control 222 and the concentrate pump 226 may control the water to concentrate ratio (e.g., 2 parts water, 1 part concentrate (2:1), 3:1, etc.) of the beverage. The mixing chamber 228 may then output the cold beverage through outlet 230 to nozzle 104 for dispensing in a cup.

If cold water solenoid valve 236 is open and no other beverage is being dispensed simultaneously, then the other hot and cold water solenoid valves may be closed and cold water may flow to mixing apparatus 238. The mixing apparatus 238 may also receive beverage concentrate supplied by a concentrate pump 244 for mixing with the cold water in a mixing chamber 246 to create a cold beverage. The flow control 240 and the concentrate pump 244 may control the water to concentrate ratio (e.g., 2:1, 3:1, etc.) of the beverage. The mixing chamber 246 may then output the cold beverage through outlet 248 to nozzle 104 for dispensing in a cup.

Thus, the mixing apparatus 220 may make either a hot or cold version of the same beverage due to the same beverage concentrate being provided from concentrate container 224 for mixing with either hot or cold water. Similarly, the mixing apparatus 238 may make either a hot or cold version of the same beverage due to the same beverage concentrate being provided from concentrate container 242 for mixing with hot or cold water.

The beverage dispenser 100 may simultaneously output beverages at different nozzles 104. In response to user input, the beverage dispenser 100 may control the hot water solenoid valves 212, 214 and the cold water solenoid valve 234, 236 to supply one of hot and cold water to each of the mixing apparatuses 220, 238. For example, the beverage dispenser 100 may simultaneously dispense hot and cold beverages at different nozzles. The beverage dispenser 100 may cause hot water solenoid valve 212 to open and cold water solenoid valve 234 to close, thereby supplying hot water to the mixing apparatus 220 to prepare a hot beverage for outputting at a first nozzle. At about the same time, the beverage dispenser 100 may cause hot water solenoid valve 214 to close and cold water solenoid valve 236 to open, thereby supplying cold water to the mixing apparatus 238 to prepare a cold beverage for outputting at a second nozzle. The beverage dispenser 100 may simultaneously prepare multiple hot beverages, multiple cold beverages, or multiple hot and cold beverages.

The beverage dispenser 100 may also blend hot and cold water to produce a beverage at a desired temperature that is less than a temperature of the hot water and greater than a temperature of the cold water. In this example, both of hot and cold solenoid valves may at least partially open to control an amount of hot and cold water supplied to a particular mixing chamber. For example, the beverage dispenser 100 may simultaneously open the hot water solenoid valve 212 and cold water solenoid valve 234 to provide hot water from the heater tank 208 and cold water from the ice bank 216. The hot and cold water streams may mix prior to reaching the mixing chamber 228, or may be delivered separately to the mixing chamber for mixing therein. The hot and cold solenoid valves may also partially open depending on the desired beverage temperature. If a warmer beverage is desired, the beverage dispenser 100 may cause the hot water solenoid valve 212 to open a larger amount and the cold water solenoid valve 234 to open a lesser amount, controlled by how close the desired temperature is to the temperature of the hot water. Conversely, if a cooler beverage is desired, the beverage dispenser 100 may cause the cold water solenoid valve 234 to open a larger amount and the hot water solenoid valve 212 to open a lesser amount. In addition to or instead of the rocker switch 108 shown in FIG. 1, the beverage dispenser 100 may include a temperature dial or other user input device permitting selection of a desired temperature intermediate of the temperature of the hot water and of the cold water. The beverage dispenser 100 may control how open each of the hot and cold water valves are in accordance with the selected temperature.

FIG. 3 illustrates an example dispense control system 302 for controlling dispensing of hot and cold versions of the same beverage by the plumbing system 200. The dispense control system 302 may include a control unit 304 that controls operation of the gear pump 210, the hot water solenoids 212, 214, and the cold water solenoid valves 234, 236, in response to inputs received at temperature selector switches 108A-B and dispense switches 102A-B. The control unit 304 may be a microcontroller or other electrical or electromechanical device that electrically communicates with the other components in the dispense control system 302. The temperature selector switch 108A may control a temperature of a first beverage dispensed in response to actuation of dispense switch 102A, and temperature selector switch 108B may control a temperature of a second beverage dispensed in response to actuation of dispense switch 102B. The first and second beverages may have the same or different flavor depending on the contents of the beverage concentrate included in the concentrate containers 224, 242. The temperature selector switch 108B may be an electromechanical switch that closes a circuit based on which of a hot or cold version is selected, and remains open if the other is selected. The dispense switch 102 may be an electromechanical switch that closes a circuit in response to user actuation and remains open when no longer actuated.

To produce a hot version of the first beverage, the control unit 304 may receive input selecting hot at a temperature selector 108A and may detect actuation of a dispense switch 102A. The control unit 304 may then send an electrical signal to relay 308A to cause a pulse width modulation (PWM) controller 310 to send an electrical signal to gear pump 210 to supply hot water from the heater tank 208. The control unit 304 may also send an electrical signal to hot water solenoid valve 212 to open and to the remaining solenoid valves 214, 234, and 236 to close, if no other beverages are being prepared simultaneously. The control unit 304 may also communicate an electrical signal to the flow control 222 to control a water flow rate and to the concentrate pump 226 to control a beverage concentrate flow rate to control a water to concentrate ratio provided to the mixing chamber 228 for creating a hot beverage.

To produce a cold version of the first beverage, the control unit 304 may receive input selecting cold at a temperature selector 108A (e.g., closing a second of two circuits) and may detect actuation of a dispense switch 102A. The control unit 304 may then send an electrical signal to open the cold water solenoid valve 234 and to close the remaining solenoid valves 212, 214, and 236, if no other beverages are being prepared simultaneously. The control unit 304 may also communicate an electrical signal to the flow control 222 to control a water flow rate and to the concentrate pump 226 to control a beverage concentrate flow rate to control a water to concentrate ratio provided to the mixing chamber 228 for creating a cold beverage.

To produce a hot version of the second beverage, the control unit 304 may receive input selecting hot at a temperature selector switch 108B and may detect actuation of a dispense switch 102B. The control unit 304 may then send a signal to relay 308B to cause a pulse width modulation (PWM) controller 310 to send an electrical signal to gear pump 210 to supply hot water from the heater tank 208. The control unit 304 may also send a signal to hot water solenoid valve 214 to open and to the remaining solenoid valves 212, 234, and 236 to close, if no other beverages are being prepared simultaneously. The control unit 304 may also communicate an electrical signal to the flow control 240 to control a water flow rate and to the concentrate pump 244 to control a beverage concentrate flow rate to control a water to concentrate ratio provided to the mixing chamber 246 for creating a hot beverage.

To produce a cold version of the second beverage, the control unit 304 may receive input selecting cold at a temperature selector switch 108B and may detect actuation of a dispense switch 102B. The control unit 304 may then send an electrical signal to open the cold water solenoid valve 236 and to close the remaining solenoid valves 212, 214, and 234, if no other beverages are being prepared simultaneously. The control unit 304 may also communicate an electrical signal to the flow control 240 to control a water flow rate and to the concentrate pump 244 to control a beverage concentrate flow rate to control a water to concentrate ratio provided to the mixing chamber 246 for creating a cold beverage. If multiple beverages are being prepared simultaneously, the control unit 304 may operate as above to cause hot or cold water to be sent to each of multiple mixing apparatuses (e.g., hot water to mixing apparatus 220, cold water to mixing apparatus 238).

FIG. 4 illustrates an example heater tank liquid level control system 402 for controlling supply of water to the heater tank 208. The heater tank liquid level control system 402 may include a liquid level control unit 404 and a water level probe 406 to control the fill solenoid valve 206 (see also FIG. 2). The liquid level control unit 404 may be a microcontroller or other electrical or electromechanical device that electrically communicates with the other components in the heater tank liquid level control system 402. The water level probe 406 may communicate an electrical signal indicative of a level of water in the heater tank 208 to the liquid level control unit 404. If the water level is below a minimum level, the liquid level control unit 404 may communicate an electrical signal to cause the fill solenoid valve 206 to open to increase the water level in the heater tank 208 and to close when the water level increases to a predetermined maximum level.

FIG. 5 illustrates an example heater tank temperature control system for controlling a temperature of hot water stored in the heater tank 208. The heater tank temperature control system 502 may include a thermocouple 504, a temperature controller 506, a relay 508, and a heater coil 510 or other heating element. The temperature controller 506 may be a microcontroller or other electrical or electromechanical device that electrically communicates with the other components in the heater tank temperature control system 502. The thermocouple 504 may communicate an electrical signal indicative of a temperature of water in the heater tank 208 to the temperature controller 506. If the temperature is above a predetermined maximum temperature, the temperature controller 506 may communicate an electrical signal to cause the heater coil 510 to turn off to stop heating water in the heater tank 208. If the temperature is below a predetermined minimum temperature, the temperature controller 506 may communicate an electrical signal to cause the heater coil 510 to turn on to start heating water in the heater tank 208.

Figure 6:
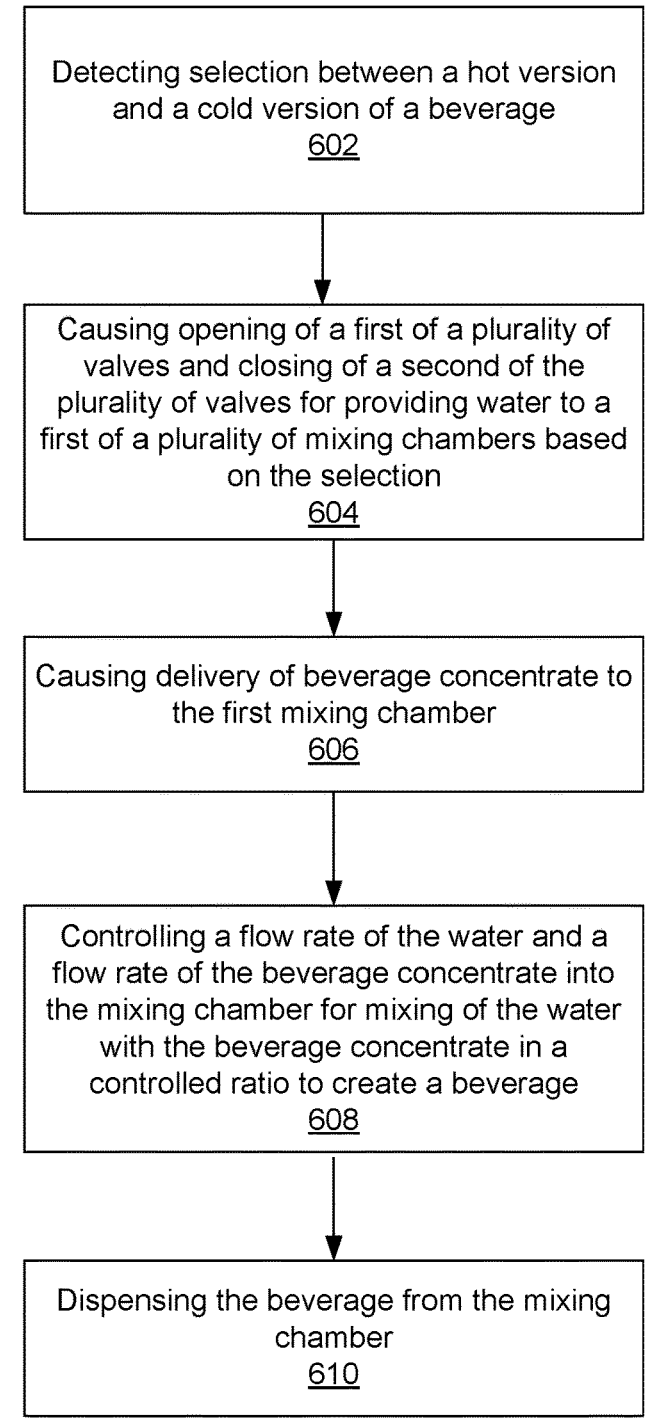
FIG. 6 illustrates an example flow diagram of a method for creating a hot or cold version of a beverage.

FIG. 6 illustrates an example flow diagram of a method for creating a hot or cold version of a beverage. The method may be implemented by the beverage dispenser depicted in FIG. 1, its plumbing system 200 shown in FIG. 2, and its control systems depicted in FIGS. 3-5. The method may begin at block 602. In block 602, the method may include detecting, by a control unit, selection between a hot version and a cold version of a beverage. In block 604, the method may include causing opening of a first of a plurality of valves and closing of a second of the plurality of valves for providing water to a first of a plurality of mixing chambers based on the selection. In block 606, the method may include causing delivery of beverage concentrate to the first mixing chamber. In block 608, the method may include controlling a flow rate of the water and a flow rate of the beverage concentrate into the mixing chamber for mixing of the water with the beverage concentrate in a controlled ratio to create the beverage. In block 610, the method may include dispensing the beverage from the mixing chamber.

The components of one or more of the example embodiments may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), application specific integrated circuits (ASIC), and the like.

Embodiments include any novel feature or combination of features disclosed herein either explicitly or any generalization thereof. While embodiments have been described with respect to specific examples including presently preferred modes of carrying out the example embodiments, those skilled in the art will appreciate that there are numerous variations and permutations of the above described systems and techniques.

We claim:
1. A method comprising:
    detecting, by a control unit, a first selection of a cold version between a hot version and a cold version of a first beverage by the actuation of a temperature indicating switch;

detecting, by the control unit, a second selection of a hot version between a hot version and a cold version of a second beverage by the actuation of a second temperature indicating switch;

providing hot water and a first beverage concentrate to one of a first or second mixing chamber based on the hot version selection in response to actuation of a first dispense switch;

providing cold water and a second beverage concentrate to the other of the first or second mixing chamber based on the cold version selection in response to actuation of a second dispense switch;

causing delivery of a first beverage concentrate to the first mixing chamber corresponding to the first selection;

causing delivery of a second beverage concentrate to the second mixing chamber corresponding to the second selection;

controlling a flow rate of the hot and cold water and a flow rate of the first and second beverage concentrate into the mixing chambers for mixing of the water with the beverage concentrate in a controlled ratio to create the first and second beverages; and dispensing the first and second beverages from their respective mixing chambers at the same time.

2. The method of claim 1, further comprising causing the opening of a first valve corresponding to a cold water valve in response to detecting actuation of one of the dispensing switches.

3. The method of claim 2, wherein the beverage concentrate is delivered from one of a plurality of concentrate containers corresponding to the actuated dispensing switch.

4. The method of claim 1, further comprising:
monitoring a level of hot water in a heater tank; and
causing opening of a fill valve to input additional water into the heater tank in response to the level falling below a predetermined minimum water level.

5. The method of claim 4, further comprising monitoring a temperature of the hot water.

6. The method of claim 5, further comprising;
causing a heating element to turn on in response to detecting that the temperature of the hot water is below a predetermined minimum temperature; and
causing a heating element to turn off in response to detecting the temperature of the hot water is above a predetermined maximum temperature.

7. The method of claim 1, further comprising
determining a first flow rate of the hot water or the cold water and a second flow rate of the beverage concentrate; and
adjusting the first flow rate or of the second flow rate to maintain the controlled ratio.

8. The method of claim 1, further comprising mixing hot water and cold water to produce a beverage less than a temperature of the hot water and greater than a temperature of the cold water.

9. The method of claim 8, wherein the mixing of the hot water and cold water is controlled by a valve supplying hot and cold water to one of the first and second mixing chambers.

10. The method of claim 8, wherein the temperature selection switch includes a temperature dial such that a temperature selection is made.

11. The method of claim 1, wherein the temperature selection switch is a rocker switch.

12. The method of claim 1, wherein the temperature selection switch is a rocker switch.

13. The method of claim 1, wherein the water to concentrate ratio is between 2:1 and 3:1.

14. The method of claim 1, wherein the first beverage concentrate and second beverage concentrate are stored in the same concentrate container.

15. The method of claim 1, wherein the first concentrate and second concentrate are pumped into the first or second mixing chamber.

* * * * *